United States Patent

[11] 3,624,316

[72] Inventor Walter L. Roberts Hickory, N.C.
[21] Appl. No. 815,321
[22] Filed Apr. 11, 1969
[45] Patented Nov. 30, 1971
[73] Assignee Superior Continental Corporation Hickory, N.C.

[54] SUBSCRIBER PRESSURE ALARM SYSTEM

28 Claims, 2 Drawing Figs.

[52] U.S. Cl. 179/175.3, 179/1 MN, 179/175.2 C
[51] Int. Cl. H04b 3/46
[50] Field of Search 179/175.3, 175.2 C, 5, 1 MN; 324/51; 340/164, 172, 213 R, 216, 253 R, 256

[56] References Cited

UNITED STATES PATENTS

| | | | |
|---|---|---|---|
| 2,724,775 | 11/1955 | Brewer | 340/172 |
| 3,009,110 | 11/1961 | Cole et al. | 340/172 |
| 3,029,420 | 4/1962 | Bango et al. | 340/213 |
| 3,120,579 | 2/1964 | Stewart | 179/5 |
| 3,268,881 | 8/1966 | Vasel | 340/213 |
| 3,412,395 | 11/1968 | Kiene | 340/253 |
| 3,484,553 | 12/1969 | Lovell | 179/5 |
| 3,360,617 | 12/1967 | Munson | 179/175.3 |
| 3,444,336 | 5/1969 | Holt et al. | 179/175.3 |

*Primary Examiner*—Kathleen H. Claffy
*Assistant Examiner*—Douglas W. Olms
*Attorney*—Roy B. Moffitt

ABSTRACT: Disclosed herein is a fail-safe pressure alarm system, virtually transparent to a telephone subscriber circuit, adapted for use with telephone transmission pairs (electrical conductors) within a pressurized system and employed to detect not only a change in value of a predetermined ambient condition (pressure), but also to indicate the approximate location in the pressurized system where the pressure change has taken place. Normally closed contacts of a pressure-sensitive device of a known location in conjunction with a "high"-value resistor completes a leakage path (circuit). That current flowing through this small leakage path also flows through a "low"-value resistor, a basic part of an alarm circuit made integral with one of the transmission conductors. A resulting voltage drop across this last mentioned resistor is used to reverse bias a transistor in the alarm circuit thereby keeping an alarm from sounding. Any system pressure loss causes contactors of the pressure-sensitive device to open, thereby removing the leakage path ("high"-value resistor) from the alarm circuitry. This causes the transistor to become conductive, allowing current to flow through a circuit thereby causing an alarm to be activated.

INVENTOR
WALT ROBERTS

Roy B. Moffitt
ATTORNEY

INVENTOR
WALT ROBERTS

Ray B. Moffitt
ATTORNEY

SUBSCRIBER PRESSURE ALARM SYSTEM

DETAILED DESCRIPTION OF THE INVENTION

This invention is generally concerned with circuitry for monitoring the condition of a telephone line and giving a warning signal in the presence of certain kind of faults (changes in predetermined ambient conditions). The invention is more specifically directed, but not necessarily limited, to circuitry for detecting the loss of pressure in a pressurized telephone cable and producing a signal at a central office to indicate such loss. However, a gain in pressure, gain or loss in temperature, humidity, and light can also be monitored in a like manner.

The use of pressurized cable for telephone service has been a long-established practice; and, it is well known to provide pressure-sensitive switches at selected locations along a telephone cable for the purpose of providing means by which loss of a pressure at such locations can be detected. However, a review of prior practices and of several prior art patents, granted for telephone cable pressure-sensing systems, reveals that the most common approach has been to provide a system that depends upon interrogation rather than continuous monitoring. That is, the usual prior art system requires an operator at some central office location to sequentially check or interrogate the condition of several pressure-sensing switches. This is generally a matter of affectively taking resistance readings for each switch and interpreting the resistance reading as indicating whether the pressure switch at each respective location is closed or open corresponding to a pressure loss, or correct pressure as the case may be. Wheatstone Bridges and similar test apparatus are frequently employed. This interrogating operation is time consuming. Furthermore, the interrogating circuit itself is often most complex and expensive to install and operate.

Another characteristic of the usual prior art pressurized telephone cable pressure-sensing systems is that the systems usually depend on the employment or use of a spare or defective cable pair for several switches. Such a cable pair is useful only for the pressure-sensing function and this pair thus has no utility for message or income-producing purposes. Thus, assuming a typical pressurized cable is 1 mile in length and has five spaced-apart pressure sensors, the system for detecting pressure loss according to prior art practices would require allocation of a spare cable pair on which all of the sensors would be placed and which would otherwise be available for message-carrying and income-producing purposes. To the extent that prior art pressure-sensing systems have utilized working cable pairs in connection with pressure sensing, the systems have required the cable pairs to be out of service when being interrogated for pressure sensing, thus potentially causing annoyance to telephone customers and to some extent, loss of income. It can also be observed that prior art pressure-detecting systems have taught various visual and audible alarms but such alarms have required the continuous use of nonworking lines. Additionally, within the area of prior art pressure-detecting systems that constantly monitor a pressurized system, these particular systems have required that the contactors of the pressure-sensing devices used to detect a pressure change be normally open, closing only upon ambient condition change, e.g., a pressure loss, thereby completing a circuit and subsequently sounding an alarm because of this completed circuit. Contrary to the teaching of prior art pressure-detecting systems, the instant invention employs ambient condition sensing devices, such as pressure-sensing devices, the same as that of prior art teaching but contactors of this pressure-sensing device are normally closed (in a nonalarming state), opening only upon a condition which would indicate a pressure loss or change, whichever the case may be, thereby sounding an alarm indicating that change. Additionally, the instant invention discloses a means (test circuitry) when activated during the sounding of an alarm (in the presence of an actual leaking pressurized system) that turns off the alarm, thus indicating that the alarm circuit itself is operative, i.e., it is indeed detecting a true loss of pressure, and the alarming condition is not produced by something other that a pressure change. Also disclosed by the instant invention is a means (test circuitry) that when activated under no actual pressure change, the alarm circuit will become activated notwithstanding, and an alarm will be sounded indicating that the alarm circuit itself is operating properly and not influenced by a variable other than a changing pressurized system.

With the foregoing in mind, the primary object of the present invention is to provide an improved circuit means for continuous monitoring of pressure at selected points in a pressurized telephone cable by use of working cable pairs.

Another object is to utilize working cable pairs for pressure monitoring of a pressurized telephone cable without impairing the usefulness of such pairs for normal commercial service.

Another object is to provide a pressure-monitoring system for a pressurized telephone cable, which automatically signals a change of pressure without requiring interrogation.

Another object is to provide a pressure-monitoring system for a pressurized telephone cable, in which each of a plurality of working cable pairs contain pressure switches that are normally closed but positioned at different locations along the length of the cable and arranged so that the cable is continuously monitored at all such locations.

A further object of the instant invention is to provide a pressure alarm system circuitry that can be quickly and easily tested to determine whether or not the alarm circuit system itself is working properly during either an alarming or nonalarming condition.

These and other objects will become apparent from the description which follows and from the drawings, in which.

The invention in general is directed to providing a plurality of pressure-operated switches at selected and known locations along the length of a pressurized cable so as to detect loss in pressure at each location. It is to be understood, however, that a pressure loss is used as exemplary only and that any ambient condition change, i.e., gain or loss, can be detected with equal facility and accuracy. Each pressure switch is placed across a particular working cable pair, and an opening of the switch corresponding to a loss of pressure below some predetermined amount and correspondingly acts to remove a predetermined high resistance from across the line. This resistance preferably is in the order of 27,000 ohms, a value substantially higher than the resistance corresponding to a telephone set utilizing the cable pair. This last-mentioned resistance may be, for example, in the order of 200 ohms. For each such cable pair having a pressure switch, there is provided at the central office auxiliary circuitry forming part of the invention and which acts to continuously monitor the condition of the pressure switch except when the cable pair is being used by a subscriber, i.e., when a subscriber handset is in the "off-hook" position. That is, the auxiliary circuitry of the invention acts to continuously monitor the condition of the pressure switch, but such auxiliary circuitry responds to current drawn by the telephone set by becoming essentially nonactivated. Thus, the monitoring circuit always assumes a nonmonitoring (a nonalarming) state whenever the subscriber uses the cable pair in which the switch is installed. Thus, unlike many of the prior art circuitry known to applicant, the present invention enables employment of working cable pairs in a pressurized system but without affecting their availability for normal subscriber service.

Whenever a pressure switch is opened in the circuitry of the invention and the cable pair in which the switch is installed is not being used by its subscriber, the monitoring circuit responds to an absence of current that previously flowed through a leakage path resistance. Because of the absence of leakage path current flow, current then flows through a transistorized alarm circuitry so as to activate an alarm in the central office. This alarm can be visual or audible or both, but in either case acts to call the central office operator's attention in the change (loss) of pressure and the general location, since each switch location is known. A central office operator is thus not required to sequentially interrogate the condition of each of the pressure switches as in the usual prior art or to interrogate a plurality of switches on a single cable pair, but rather is automatically advised by signal (audible or visual) whenever any pressure switch is opened.

Figure 1:
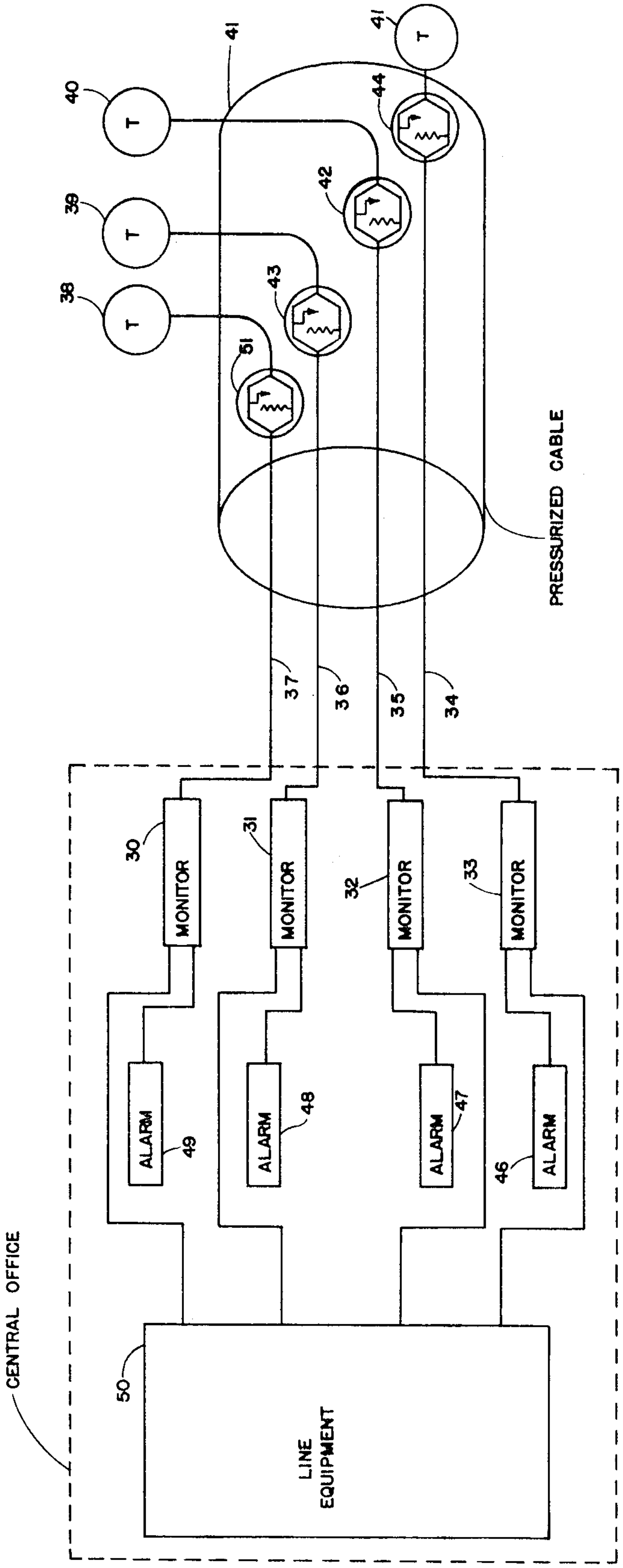
FIG. 1 is a generalized diagram of a pressurized telephone cable system incorporating the invention.

In FIG. 1, there is shown a somewhat generalized diagram in which a pressurized cable 41 encloses representative working cable pairs 34, 35, 36, and 37. Pressure switches 42, 43, 44, and 51, are located at predetermined locations along the length of cable 41 and the cable pairs service the telephones numbered respectively 38, 39, and 40. At the central office there is the usual central office equipment 50. For each of the cable pairs 34, 35, 36, and 37 being used, there is provided an auxiliary monitor circuit and alarm. The monitors are shown as elements 30, 31, 32, and 33 and the alarms 46, 47, 48, and 49. As is explained in more detail later in the description, each of the monitor circuits 30, 31, 32, and 33, will actuate its respective alarm whenever the corresponding pressure switch is opened, so as to indicate a change (loss) of pressure. Thus, if pressure switch 51 is open, monitor 30 will actuate alarm 49; however, if the subscriber puts the corresponding telephone 38 into use during alarming conditions, the monitoring and alarm circuitry will be disabled and the corresponding cable pair will operate in a normal manner. If pressure switch 51 is closed, monitor 30 will continuously monitor its condition through cable pair 37 so long as the telephone 38 is not being used. Once telephone 38 is placed into use, however, the cable pair 37 becomes available for message purposes and monitor 30 is disabled. Upon pressure switch 51 being opened, the alarm 49 will be actuated and remain actuated so long as telephone 38 is not being used. Immediately upon the subscriber placing telephone 38 into use, the monitor circuit 30 and alarm 49 will be disabled and will remain disabled so long as telephone 38 is in use. However, once use of telephone 38 is terminated, assuming that the pressure switch 51 remains open (responsive to pressure conditions), the alarm 49 will again be actuated and remain actuated until cut off by an operator or until the pressure fault has been corrected and switch 51 has again closed. Irrespective of whether the pressure switch is opened or closed, use of a telephone set by a subscriber will not cause actuation of the alarm. This is brought about because when a telephone set is placed into actual service, current flowing through that telephone set and onto the cable pairs is caused to go through a resistance, which is not only an integral part of the alarm monitoring system itself but is in series and placed in one of the legs of the cable pair itself. Current flowing through this resistance causes a voltage drop and the transistorized circuitry of the alarm system thereby becomes biased (nonconductive), thereby not permitting current to flow through the alarm monitoring circuitry. Consequently, it being only when current flows through the alarm monitoring circuitry that alarm sounds, there is no alarm activation when a subscriber places a telephone into actual service. Upon a subscriber rendering his telephone set to an "on-hook" condition, current no longer flows through the telephone set as such; therefore, the biasing voltage drop across the resistor forming an integral part of the alarm system itself is then not present. Since the contactors of the pressure-sensing switch are open during the alarm condition, current flows through the monitoring transistorized alarm circuitry because of the absence of the voltage drop caused by the last-mentioned resistor in the transmission cable pair. In this condition, the transistorized circuitry is forward biased and thereby conductive. A conductive monitoring alarm circuitry activates an alarm. This particular structure and arrangement thus allows a subscriber to not be bothered with an activated alarm during actual commercial use of the cable pair serving that particular subscriber.

Figure 2:
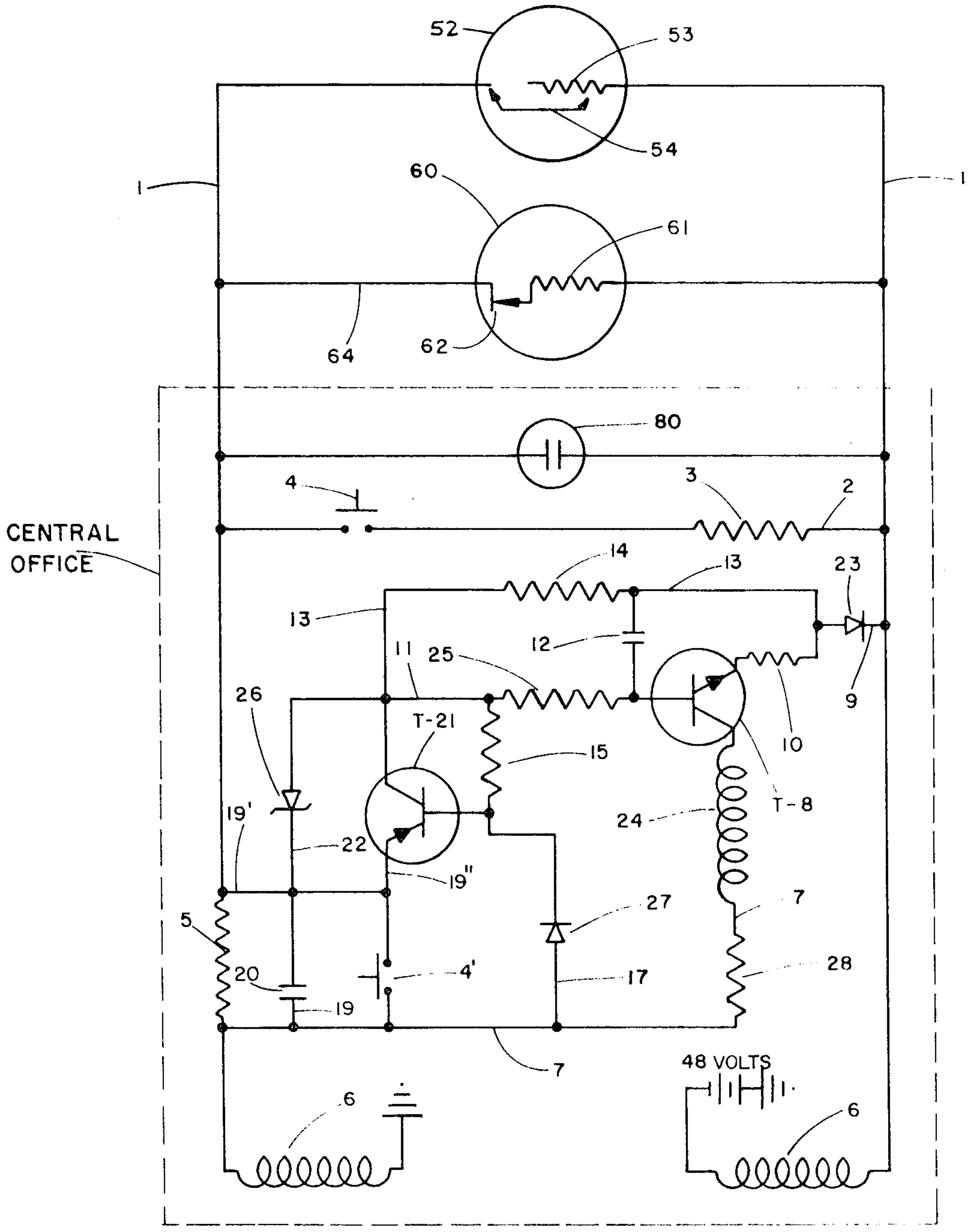
FIG. 2 is a circuit diagram of a system incorporating the invention in conjunction with a single pressurized-sensing switch and working cable pair.

Reference is made next to FIG. 2 in which a monitoring and alarm circuit for one working cable pair is shown, it being understood that this same arrangement is duplicated for the number of pressure switches being monitored. In FIG. 2, the lines 1—1 represent the lines forming a cable pair for any subscriber line, frequently referred to as the "ring" and "tip" line. A telephone is represented at 52, the telephone set operative resistance at 53 and the telephone handset at 54. A corresponding pressure switch 60 includes an operative resistor 61. As will be better appreciated from later description, the values of resistance 53 and resistor 61 vary widely with differing operating conditions, but in one system, in which the invention has been employed, the value of resistance 53, i.e., the telephone operative resistance, has averaged about 3,000 ohms and the value of resistor 61, the pressure switch operative resistor, was selected to be 27,000 ohms.

Continuing the explanation, lead 64, which connects cable pair 1—1 with the pressure-sensitive switch 60 and its resistance 61, delineates a leakage path. Element 60, as previously discussed, is a pneumatic piece of apparatus that maintains the leakage path in an electrically conductive state, so long as the predetermined level of pneumatic pressure is present. This electrically conductive state obviously includes resistor 61, which has an indicated value of approximately 27,000 ohms. There is at least one pneumatic-sensing device like that of element 60, capable of causing an open circuit in lead 64, for each cable pair. Inasmuch as each cable pair is identified at the central office, [represented generally by coils 6] and the geographic location of each pneumatic-sensing device on each cable pair is known, a pressure failure can be located as to its distance from the central office 6 by cable pair indentification and pneumatic-sensing device location on that particular cable pair.

The alarm circuitry is that circuitry, other than coils 6, located in the central office. This circuitry, working in conjunction with the leakage path indicated by lead 64 and its associated pressure-sensing device 60 in its nonalarming state, normally bridges the cable pair with a high resistance (somewhere in the neighborhood of 20,000 to 50,000 ohms) and is, generally speaking, in the neighborhood of 27,000 ohms. This is characterized as a leakage path, the function of which will be shown later.

A resistance [element 5], having a value in the neighborhood of 50 to 25 ohms is inserted in a subscriber loop [cable pair 1—1] at the central office end, and is capacitor bypassed [see element 20 in lead 19 parallel to resistor 5] to avoid upsetting line balance for voice frequency currents. A solid-state device monitors the voltage drop across this resistance and indicates a "normal" (nonalarming) condition so long as 2 to 3 milliamperes (2–3 ma.) minimum current is flowing in the cable pair loop [through resistor 5]. The solid-state device, mentioned previously, basically is made up of vacuum tubes or transistors T–21 and T–8 (semiconductor means made from at least three elements for providing no less than two transitions from positive to negative conduction) and associated circuitry. Element 24 is the coil portion of the relay (not completely shown) used to activate a conventional alarm system (not shown). Coil 24, through lead 7 and resistor 28 is in electrical connection with the left-hand member of cable pair 1—1 and the emitter of transistor T–21 through interconnecting lead 19. The collector of transistor T–21 is in electrical connection with lead 13, which is in turn connected to resistor 14, said resistor being connected through interconnecting lead 13 to diode 23, which is connected electrically to the right-hand member of cable pair 1—1. Diode 26 is in electrical connection across the collector and emitter of transistor T–21, by means of lead 22. Capacitor 20, which is the capacitor bypass for resistor 5, is in electrical connection by means of lead 17 with biasing diode 27, which in turn is in electrical connection with resistor 15 via lead 17. Resistor 15 is base connected to transistor T–21. Capacitor 12 is electrically connected to the base of transistor T–8 the same as resistor 25. The emitter of transistor T–8 is connected to resistor 10, said resistor thence being in electrical connection with the right-hand member of cable pair 1—1 through blocking diode 23. The collector of transistor T–8 is connected to coil 24 by means of lead 7, which has been previously described as the coil portion of an alarm relay (not completely shown) used to draw in (activate) contactors of an alarm system (not shown). As has been previously mentioned, the central office is represented by a coil 6 and the 48 DC source, Gas tube 80 is bridged across cable pairs 1—1 and is used to protect the circuit against voltage surges from outside sources such as lightning and the like.

Current leakage (2 to 3 milliamperes) through closed contactors of pressure-sensing device 60 along lead 64 is enough to reverse bias (turn off or render nonconductive transistor T–21 by means of this current causing a resulting voltage drop across resistor 5. Such an electrical state represents a non-failure pressure condition and accordingly no current flows through transistor T–21 during such a condition. Upon a change of pressure conditions in the cable (e.g. a loss), i.e., contactors of element 60 are opened, current ceases to flow through lead 1 and through resistor 5. Current then flows through transistor T–21, turning on transistor T–8. Current flowing during alarm condition through resistor 5 is not sufficient enough in magnitude to reverse bias (turn off) transistor T–21. When transistor T–21 turns on, transistor T–8 is forward biased as a result of a voltage drop across resistor 14, thus allowing transistor T–8 to turn on, i.e., become conductive. Current flows onto lead 9 through resistor 10 and transistor T–8, onto lead 7, and thence through coil 24 thereby energizing same. This action pulls in (activates) a relay (not shown) that subsequently sounds an alarm, indicating that pneumatic pressure has changed, i.e., has failed to reach a predetermined level at the location of pneumatic sensing device 60 and contactors 62 inherent therewith. Thus, it can be seen that it is current flowing in transistor T–21 that causes the alarm system to become activated.

The voltage drop across resistor 5 is enough to maintain a reverse bias of transistor T–21 and thereby preventing transistor T–21 to conduct as opposed to an alarm condition when the voltage disappears and transistor T–21 is forward biased by resistor 15 and diode 27.

Zener diode 26 is used to protect transistor T–21 from transient electrical surges. The reason that there are two transistors in the alarm circuit as opposed to just one, is to achieve a sensitivity of an order to detect small variations in circuit conditions. Diode 23 helps to make the installation of the alarm circuit foolproof because if the alarm circuit were to be hooked up in reverse through inadvertence, the circuit though not operable in this reverse connection, would nevertheless not be harmed from the electrical energy applied to it. This diode 23 also blocks transient surges coming from the cable pair line 1–1 from the alarm circuit itself. Transistor T–21 is a PNP type and T–8 is a NPN type.

The combination of resistor 25 and capacitor 12 creates a RC network with a long time constant. This network arrangement keeps the alarm (coil 24) from being responsive to spurious transient currents. Resistor 28 is a current-limiting resistor working in convert with coil 24 in order to keep the current flowing through transistor T–8 in the order of 1.7 ma.

Switches 4 and 4', plus associated circuitry therewith, provide means for checking the alarm circuitry per se to determine whether or not the alarm circuitry is properly functioning and not influenced by factors other than an actual pressure change. For example, when there is no true actual leak in the pressurized system, switch 4' can be moved from its normally opened position to a closed position. This switch will activate the alarm and thus check out the alarm monitoring circuitry to see if it itself is properly operative. Basically, the activation of switch 4' removes (shunts) resistor 5 from the circuit and any corresponding inherent voltage bias as applied to transistor T–21. Thus, transistor T–21 becomes conductive when switch 4' is moved from its normally opened to a closed position. When the alarm monitoring circuitry is indicating a leak in the pressurized system by sounding an alarm, the monitoring circuit can be tested to see whether or not there is indeed a leak or whether or not extraneous factors are causing the alarm condition to sound. To accomplish this test, one need only to move switch 4 from its normally open, to a closed position. If the alarm condition is due to a failure in the pressurized system, then the alarm will be turned off, indicating that the circuitry of the monitoring system is properly functioning. Basically, what the closure of switch 4 accomplishes is the electrical connecting of an additional resistor simulating a closed leakage path between cable pairs 1—1. It will be noted that switch 4, which is connected by lead 2 from one side of the transmission cable pair 1—1 to the other side, also includes resistor 3, a resistor having a value of approximately 27,000 ohms, the same value as that of resistor 61 in the leakage path formed by elements 64 and 60.

When switch 4 is moved from its normally open to its closed position, this procedure bridges across cable pairs 1—1 a simulated leakage path or simulated resistor having essentially the same value as the leakage path. That is to say, resistor 3 is essentially the same value as resistor 61, and the placing of lead 2 with resistor 3 across cable pair 1—1 is a simulation of leakage path formed by elements 61, 62, 60 and 64.

When a subscriber [element 52] goes off-hook during the sounding of an alarm [coil 24 in the energized state], a current in the loop [cable pairs 1—1 ] is restored [resistance 53 is less than resistance 61]. Consequently, transistor T–21 is reverse biased because of the increased voltage drop across resistor 5. Therefore, no current flows through this transistor and thus while the subscriber is in the off-hook position the alarm system is inactive. When the subscriber subsequently goes on-hook [taking out resistor 53] biasing voltage created by current flowing through resistor 5 is thus removed. Thus the circuit returns to its previous alarming condition as before. The pneumatic pressure-sensing device [element 60] usually is of the conventional bellows type, well-known in the art, and normally set for 2 to 3 pounds per square inch at the far end of the cable and 8 to 9 pounds per square inch at the near end.

In summary, the foregoing disclosure delineates pressure-sensing devices with contactors therein on each one of an operating cable pair within change has given pressurized cable. When the pressure changes, e.g., falls below a minimum value, the pressure-sensing device causes contactors therein to change from their normally closed to an alarming open position. Inasmuch as the pressure-sensing devices with their associated contactors are placed on each individual cable pair at predetermined locations along a telecommunications trunk route, a failure identified by a given cable pair indicates a particular pressure-sensing device contactors and therefore pinpointing the location on the trunk of the cable where the pressure failure or change has occurred.

Testing circuitry is incorporated in the monitoring alarm circuit so that the circuit per se can be checked to determine whether or not it itself is in a viable truly indicating operating condition. When one wants to determine whether there is indeed a leak or condition that changes the pressure in the pressurized system, activating integral test circuitry would, if the monitoring circuit is operating properly, turn off the alarm, thereby indicating that the monitoring alarm circuit is indeed in an operable condition and not influenced by extraneous factors. When one wants to truly determine whether or not there is change in pressure in the cable, e.g., there is no leak in the pressurized system, one only has to activate a test circuitry. If this activation sounds an alarm, then such activation would indicate that the monitoring alarm circuitry is indeed operating properly and indicating truly.

From the foregoing, it is believed that the invention may be readily understood by those skilled in the art without further description, it being born in mind that numerous changes may be made in the details disclosed without departing from the spirit of the invention as set forth in the following claims.

I claim:

1. A monitoring circuit for detecting the occurrence of a predetermined condition comprising:

a. a pair of conductors bridged by a current leakage path made up of resistance means and normally closed switch means connected in series with said resistance means, said switch means being adapted to be opened upon the occurrence of said predetermined condition; and, b. an alarm activating circuit including: a resistor electrically in series with one of said conductors and connected to a control circuit bridging said pair of electrical conductors, said control circuit being rendered electrically nonconductive in response to a predetermined voltage drop occurring across said resistor and caused by current flow through said current leakage path and said resistor when said switch means is closed, and said control circuit being rendered electrically conductive in response to a decrease of said voltage drop.

2. A monitoring circuit as defined in claim 1, wherein an additional resistance is arranged to disconnectably bridge said pair of electrical conductors, said additional resistance being of a value lower than that of said resistance means so that when said additional resistance is connected in bridging relation across said conductors, said current leakage path is shunted.

3. A monitoring circuit as defined in claim 2, wherein said additional resistance forms a part of a telephone set.

4. A monitoring circuit as defined in claim 1, wherein a resistive test means is selectively connectable between said pair of electrical conductors and is adapted for electrically connecting a resistor, equivalent in value to said leakage path, between said electrical conductors.

5. A monitoring circuit as defined in claim 1, wherein testing means is provided for shunting said resistor.

6. A monitoring circuit as defined in claim 1, wherein said control circuit includes means for operating an alarm in response to the electrically conductive state of said control circuit.

7. A monitoring circuit as defined in claim 1, wherein said control circuit includes transistors means, circuit connection means for rendering said transistor means electrically nonconductive in response to said voltage drop decrease, and means controlled by said transistor means for operating an alarm to indicate the occurrence of said condition.

8. A monitoring circuit as defined in claim 1, wherein said control circuit contains a first transistor connected to one of said electrical conductors, said first transistor being also connected through a voltage dividing network to a second transistor, which in turn is connected to the remaining electrical conductor and a means for activating an alarm, which in turn is connected to the first-mentioned conductor, said second transistor having an electrically conductive state and an electrically nonconductive state, said first transistor being responsive to said decrease in said voltage drop to place said second transistor in a predetermined one of said states, and said alarm activating means being conditioned by said second transistor when in said predetermined one of said states to operate said alarm.

9. A monitoring circuit as defined in claim 1, wherein said control circuit is in electrical connection with the other of said electrical conductors through a diode.

10. A monitoring circuit as defined in claim 3, wherein said electrical conductors are connected to a power supply means in a telephone central office, said power supply means providing a source for said current flow through said leakage path and said resistor.

11. A monitoring circuit as defined in claim 1, wherein said current leakage path is enclosed by cable sheath.

12. A monitoring circuit as defined in claim 1, wherein said switch means are pressure responsive.

13. A monitoring circuit comprising:

a. a current leakage path having first and second terminals adapted to be connected to a pair of conductors of a multiple conductor transmission line, said leakage path being defined by resistance means and normally closed switch means connected in series with said resistance means between said terminals, said switch means being adapted to be opened upon the occurrence of a predetermined monitored condition; and b. an alarm activating circuit including a resistor connected in series with one of said conductors and a control circuit bridged across said conductors, said resistor being connected to said first terminal, and said control circuit being connected to said resistor and to said second terminal, said control circuit being rendered electrically nonconductive in response to a predetermined voltage drop occurring across said resistor and caused by current flowing through said current leakage path and through said resistor when said switch means is closed, and said control circuit being rendered electrically conductive in response to a decrease of said voltage drop.

14. A monitoring circuit as defined in claim 13, wherein a resistive test means has a further resistor, equivalent in value to said leakage path and means for selectively and disconnectably bridging said further conductor across said conductors.

15. A monitoring circuit as defined in claim 13, wherein testing means is provided for shunting said resistor.

16. A monitoring circuit as defined in claim 13, wherein said control circuit contains a means for operating an alarm in response to the electrically conductive state of said control circuit.

17. A monitoring circuit as defined in claim 13, wherein said control circuit contains transistor means and circuit connection means for rendering said transistor means electrically nonconductive by said predetermined voltage drop when said switch means is closed and for rendering said transistor means electrically conductive in response to said decrease of said voltage drop, and means conditioned by said transistor means for operating an alarm when said transistor means is in its conductive state.

18. A monitoring circuit as defined in claim 13, wherein said control circuit contains a first transistor connected to said resistor and also through a voltage dividing network to a second transistor which in turn is connected (i) to said current leakage path and (ii) to a means for activating an alarm that is also connected to said resistor, said first and second transistors having electrically conductive and electrically nonconductive states, said first transistor being placed in a predetermined one of said states in response to said decrease in said voltage drop, and said second transistor being operated to one of its predetermined states when said first transistor is operated to its predetermined one of said states to condition said alarm activating means for activating said alarm.

19. A monitoring circuit as defined in claim 13, wherein said control circuit is connected through a diode to said current leakage path.

20. A monitoring circuit as defined in claim 13, wherein said switch means are pressure responsive.

21. A monitoring system comprising circuit means having a two conductor transmission line, first resistance means connected in series with one of the conductors of said transmission line, an electrical power source connected across the conductors of said transmission line to provide for a flow of current through said first resistance means when a circuit is completed between said conductors of said transmission line, a device for detecting the occurrence of a predetermined condition and having normally closed contact means, a current leakage network containing said contact means and second resistance means in series with said contact means, said current leakage network being bridged across said conductors for completing a circuit across said conductors to enable current to flow serially through said second resistance means and said contact means when said contact means are closed, said contact means being adapted to open in response to the occurrence of said predetermined condition to provide for a predetermined variation in said flow of current through said first resistance means for varying the voltage measured across said first resistance means, and means connected to said conductors and being responsive to the voltage measured across said resistance means for signalling the presence of said predetermined condition when said predetermined variation occurs.

22. The monitoring system defined in claim 21 wherein said means for signalling the presence of said predetermined condition when said predetermined variation occurs comprises a transistorized circuit electrically connected across said conductors in parallel relation to said contact means.

23. The monitoring system defined in claim 21 wherein said device is pressure responsive and wherein said predetermined condition is a predetermined change in pressure.

24. In a telephone system having a telephone set and circuit means including a two conductor transmission line for connecting said set to a central office terminal, electrical resistance means connected in series with one of the conductors of said transmission line to provide for a voltage drop across said resistance means when a circuit is completed between the conductors of said transmission line, a condition detecting device having normally closed switch means, a circuit branch containing said switch means and a resistor in series with said switch means, said circuit branch being bridged across said conductors in parallel relation with said telephone set for completing a circuit across said conductors in absence of a predetermined condition, said switch means being adapted to open in response to the occurrence of said predetermined condition to provide for a predetermined variation in the voltage measured across said resistance means, and means responsive to the voltage measured across said resistance means for signalling the occurrence of said predetermined condition when said predetermined variation occurs.

25. The telephone system defined in claim 24, wherein said predetermined condition constitute a predetermined variation in pressure in a pressurized cable that forms a part of said transmission line, and wherein said switch means is opened in response to said predetermined variation of pressure.

26. In a telephone system having a telephone set transferrable between on-hook and off-hook states and circuit means including a two conductor transmission line for connecting said set to a central office terminal, said telephone set being operative to complete a first circuit between the conductors of said transmission line when transferred to said off-hook state and to interrupt said first circuit when transferred to said on-hook state, detecting means for monitoring a predetermined condition, said detecting means having normally closed switch means, a circuit branch containing said switch means and first resistance means in series with said switch means, said circuit branch providing a s second circuit bridged across said conductors in the absence of said predetermined condition, said switch means being adapted to open upon the occurrence of said predetermined condition to interrupt said second circuit, second resistance means connected in one of the conductors of said transmission line in series with said first and second circuits, a power source connected across the conductors of said transmission line to provide for a flow of current through and a voltage drop across said second resistance means whenever either or both of said first and second circuits are completed, said first and second circuits, upon being concomitantly interrupted, providing for a predetermined variation in the voltage measured across said second resistance means, and voltage responsive circuit means electrically connected to said transmission line and being responsive to the occurrence of said predetermined variation to provide a signal indicating the occurrence of said predetermined condition.

27. The telephone system defined in claim 26 wherein the completion of said first circuit provides a voltage drop across said second resistance means that prevents said voltage responsive circuit means from being conditioned to signal the occurrence of said predetermined condition even when said second circuit is interrupted.

28. The telephone system defined in claim 27 wherein said circuit means is bridged across said conductors to receive operating power from said power source.

* * * * *

UNITED STATES PATENT OFFICE

CERTIFICATE OF CORRECTION

Patent No. 3,624,316 Dated November 30, 1971

Inventor(s) Walter L. Roberts

It is certified that error appears in the above-identified patent and that said Letters Patent are hereby corrected as shown below:

Claim 21, line 22 (Column 9), before "resistance" insert --first--.

Signed and sealed this 6th day of February 1973.

(SEAL)
Attest:

EDWARD M.FLETCHER,JR.
Attesting Officer

ROBERT GOTTSCHALK
Commissioner of Patents